United States Patent
Toguchi et al.

(10) Patent No.: US 7,084,806 B2
(45) Date of Patent: Aug. 1, 2006

(54) INTRUDING OBJECT DETECTING APPARATUS, AND SETTING APPARATUS, SETTING PROCESS AND SETTING CONFIRMATION PROCESS THEREFOR

(75) Inventors: Yoichi Toguchi, Kanagawa (JP); Yui Tada, Kyoto (JP); Shinichiro Okamura, Kyoto (JP)

(73) Assignee: OMRON Corporation, Kyoto (JP)

( * ) Notice: Subject to any disclaimer, the term of this patent is extended or adjusted under 35 U.S.C. 154(b) by 291 days.

(21) Appl. No.: 10/648,035

(22) Filed: Aug. 26, 2003

(65) Prior Publication Data
US 2004/0082342 A1    Apr. 29, 2004

(30) Foreign Application Priority Data
Aug. 27, 2002    (JP)    ............. 2002-246890

(51) Int. Cl.
  G01S 13/62    (2006.01)
  G01S 7/40    (2006.01)
(52) U.S. Cl. ............. 342/28; 342/91; 342/92; 342/107; 342/114; 342/174
(58) Field of Classification Search ........... 342/27, 342/28, 91, 92, 97, 107, 109, 114, 115, 165, 342/173, 174
See application file for complete search history.

(56) References Cited

U.S. PATENT DOCUMENTS

| | | | |
|---|---|---|---|
| 3,877,002 A * | 4/1975 | Cheal et al. | 340/552 |
| 3,947,834 A * | 3/1976 | Gershberg et al. | 340/554 |
| 4,132,988 A * | 1/1979 | Blacksmith et al. | 340/552 |
| 4,191,953 A * | 3/1980 | Woode | 340/552 |
| 4,527,151 A * | 7/1985 | Byrne | 340/554 |
| 4,588,988 A * | 5/1986 | Karas | 340/552 |
| 5,493,304 A * | 2/1996 | Lee et al. | 342/360 |
| 6,169,512 B1 | 1/2001 | Beasley | 342/174 |
| 6,518,915 B1 * | 2/2003 | Schutz et al. | 342/28 |
| 6,937,183 B1 * | 8/2005 | Nishiguchi et al. | 342/28 |
| 2001/0035837 A1 | 11/2001 | Fullerton et al. | |
| 2004/0082342 A1 * | 4/2004 | Toguchi et al. | 455/456.1 |
| 2004/0125009 A1 * | 7/2004 | Nishiguchi et al. | 342/28 |

(Continued)

FOREIGN PATENT DOCUMENTS

EP    1394564 A2 *    3/2004

(Continued)

OTHER PUBLICATIONS

European Search Report dated Mar. 18, 2005 (5 pages).

(Continued)

*Primary Examiner*—John B. Sotomayor
(74) *Attorney, Agent, or Firm*—Osha Liang LLP

(57) ABSTRACT

Provided are an intruding object detecting apparatus (a radio wave sensor) capable of setting an arbitrary detection region, an apparatus for setting the detection region and a setting processe. An intruding object detecting apparatus 51 is installed in a corner of a room 53, a coordinate system is defined in which a location of the intruding object detecting apparatus 51 is an origin thereof, and coordinates are a distance r from the intruding object detecting apparatus and a scanning angle θ of a transmission antenna/reception antenna of the intruding object detecting apparatus, and a state corresponding to the coordinate system is stored (b) in a storage means; thereby enabling the detection region 52 of the intruding object detecting apparatus can be arbitrarily set. Moreover, the setting can be performed with ease using a reflector or a transmitter, or alternatively, using a setting apparatus constituted of the reflector and the transmitter, combined.

11 Claims, 15 Drawing Sheets

U.S. PATENT DOCUMENTS

2004/0125012 A1* 7/2004 Okamura et al. ............. 342/81

FOREIGN PATENT DOCUMENTS

JP 09/138280 5/1997

OTHER PUBLICATIONS

Patent Abstracts of Japan; Publication No. 56086376 dated Jul. 14, 1981 (1 page).

Patent Abstracts of Japan, publication No. 09/138280, publication date May 27, 1997.

European Search Report dated Jan. 30, 2004 (4 pgs.).

European Abstract Publication No. 03102625.5 (1 pg.).

Patent Abstracts of Japan; Publication No. 2002228744 dated Aug. 14, 2002 (1 pg.).

* cited by examiner

| θ\r | 1 | 2 | 3 | 4 | 5 | 6 | 7 | 8 | 9 | 10 | 11 | ... |
|---|---|---|---|---|---|---|---|---|---|---|---|---|
| 0 | | | | | | | | | | | | |
| 10 | | | | | | | | | | 1 | 1 | |
| 20 | | | | | | | | | | | | |
| 30 | | | | | | | | | | | | |
| 40 | | | | | | | | | | | | |
| 50 | | | | | | | | | | | | |
| 60 | | | | | | | | | | | | |
| 70 | | | | | | | | | | | | |
| 80 | | | | | | | | | | | | |
| 90 | | | | 1 | 1 | 1 | 1 | 1 | 1 | | | |

INTRUDING OBJECT DETECTING APPARATUS, AND SETTING APPARATUS, SETTING PROCESS AND SETTING CONFIRMATION PROCESS THEREFOR

BACKGROUND OF THE INVENTION

1. Field of the Invention

The present invention relates to an apparatus detecting an object intruding into a detection region using a radio wave with the help of technologies such as a radar, a process setting the detection region, and a process confirming the set detection region.

2. Description of the Prior Art

There has been traditionally available an intruding object detecting apparatus using a radio wave, of a scheme mechanically rotating or reciprocating a radar apparatus to detect a distance of an intruding object based on a reflection wave. Furthermore, an intruding object detecting apparatus of a different scheme has also been traditionally available in which plural radar apparatuses are used, a detectable region is divided into detection regions so as to specify into which detection region an intruding object intrudes.

Intruding object detection apparatuses each using a radio wave are classified into two kinds: one in which a detection region is fixed and the other in which a radio wave beam with a narrow directivity is radiated from a transmission antenna and a wide detection region is scanned with the transmission antenna to monitor.

An intruding object detecting apparatus of a fixed type has a single detection region (a single direction); therefore monitoring plural regions requires plural apparatuses of the kind to be installed. Besides, in a case of the intruding object detecting apparatus of a fixed type, the detection region is fixed when being installed. Since an intruding object detecting apparatus is, inmost of cases, installed on a ceiling or at the top of a pole out of the reach of a person's hand, the apparatus has a problem that a once set detection region is not easy to be freely altered.

In an intruding object detecting apparatus of a scanning type, a detection region is scanned with an antenna to process the region as a plane, while part of the detection region cannot be selectively set as a necessary detection region with ease.

SUMMARY OF THE INVENTION

Embodiments of the present invention have one or more of the following aspects.

In a first aspect the invention provides a setting process for an intruding object detecting apparatus radiating a radio wave into a detection region to receive a radio wave (a reflection wave) reflected from an object intruding into the detection region and to thereby detect the object, in which a reflector reflecting a radio wave is placed in a place that is set as the detection region; a radio wave is radiated from a transmission antenna of the intruding object detecting apparatus; a reflection wave from the reflector is received by a reception antenna of the intruding object detecting apparatus; and a position of the reflector calculated based on the reflection wave is stored into storage means of the intruding object detecting apparatus as the detection region.

According to the first aspect of the invention, the reflector with a predetermined reflectance for a radio wave radiated from the intruding object detecting apparatus is placed in a place that is desired to be set as the detection region when setting with the intruding object detecting apparatus and a radio wave radiated from the transmission antenna is reflected to the reception antenna, which makes it possible for the intruding object detecting apparatus to discriminate a reflection wave from the reflector from a reflection wave from a different object, thereby enabling the detection region to be set with ease.

In a second aspect the invention provides a setting process for an intruding object detecting apparatus radiating a radio wave into a detection region to receive a radio wave (a reflection wave) reflected from an object intruding into the detection region and to thereby detect the object, in which a transmitter transmitting a radio wave is placed in a place that is set as the detection region, a radio wave from the transmitter is received by a reception antenna of the intruding object detecting apparatus and a position of the transmitter calculated based on an ratio wave from the transmitter is stored into storage means of the intruding object detecting apparatus as the detection region.

According to the second aspect of the invention, the transmitter transmits the radio wave having a frequency capable of being received by the reception antenna of the intruding object detection apparatus when setting the detection region of the intruding object detecting apparatus, which makes it possible that the intruding object detecting apparatus specifies a direction of the transmitter with ease, thereby enabling the detection region to be set with simplicity. Especially, when the radio wave is radiated from the intruding object detecting apparatus in a case where an installed object is placed in a place that is to be set as the detection region, the second invention is effective for setting such a place as the detection region, where complexity in reflection occurs.

In a first preferred embodiment of the invention, the transmitter includes input means, the transmitter transmits an inputted setting value from the input means, the intruding object detecting apparatus determines the detection region based on the setting value that the intruding object detecting apparatus receives and the position of the transmitter calculated based on a radio wave from the transmitter, and the detection region is stored into the storage means.

With the inventive setting process, a setter can input the setting value to the transmitter and transmit the setting value with the transmitter from a place that is set as the detection region, which makes it possible that the intruding object detecting apparatus not only specifies a direction of a radio wave from the transmitter and sets a place in the direction as the detection region, but also facilitates complicated setting of the detection region.

In a third aspect the invention provides a setting process for an intruding object detecting apparatus radiating a radio wave into a detection region to receive a radio wave (a reflection wave) reflected from an object intruding into the detection region and to thereby detect the object, in which a setting apparatus constituted of a reflector reflecting a radio wave and a transmitter transmitting a radio wave is placed in a place that is set as the detection region, a radio wave transmitted from the setting apparatus is received by a reception antenna of the intruding object detecting apparatus, a radio wave is radiated from a transmission antenna of the intruding object detecting apparatus, a reflection wave from the setting apparatus is received by the reception antenna of the intruding object detecting apparatus and a position of the setting apparatus calculated based on a radio wave transmitted by the setting apparatus and the reflection wave is stored into storage means of the intruding object detection apparatus as the detection region.

According to the third aspect of the invention, the transmitter transmits a radio wave having a frequency capable of being received by the reception antenna of the intruding object detection apparatus when setting the detection region of the intruding object detecting apparatus, which makes it possible that the intruding object detecting apparatus specifies a direction of the transmitter with ease; furthermore, a radio wave is radiated from the transmission antenna of the intruding object detecting apparatus in the direction and a reflection wave from the reflector of the setting apparatus is received by the receiving antenna of the intruding object detecting apparatus, which makes it possible that a distance to the setting apparatus can be calculated, thereby enabling the detection region to be set with correctness.

In a fourth aspect the invention provides a confirmation process for setting with an intruding object detecting apparatus radiating a radio wave into a detection region to receive a radio wave (a reflection wave) reflected from an object intruding into the detection region and to thereby detect the object, in which a reflector reflecting a radio wave is placed in the detection region, a radio wave is radiated from a transmission antenna of the intruding object detecting apparatus, a reflection wave from the reflector is received by a reception antenna of the intruding object detecting apparatus and collation is performed on a position of the reflector calculated based on the reflection wave and the detection region stored in advance in storage means of the intruding object detecting apparatus, wherein the intruding object detecting apparatus outputs a detection signal in a case where the position of the reflector is included in the detection region.

According to the fourth aspect of the invention, in order to confirm the set detection region of the intruding object detecting apparatus, the reflector having a predetermined reflectance is placed in the detection region, in the peripheral area thereof or moved therein so that the intruding object detecting apparatus receives the reflectance wave from the reflector, which makes it possible that the detection region set by the intruding object detecting apparatus is confirmed by a position of the reflector, thereby enabling easy confirmation on whether or not the detection region intended by a setter has been effectively set.

In a fifth aspect the invention provides a confirmation method for setting with an intruding object detecting apparatus radiating a radio wave into a detection region to receive a radio wave (a reflection wave) reflected from an object intruding into the detection region and to thereby detect the object, in which a transmitter transmitting a radio wave is placed in the detection region, a radio wave is transmitted from the transmitter and collation is performed on a position of the transmitter calculated based on a radio wave from the transmitter and the detection region stored in advance in storage means of the intruding object detecting apparatus, wherein the intruding object detecting apparatus outputs a detection signal in a case where the position of the transmitter is included in the detection region.

According to the fifth aspect of the invention, in order to confirm the set detection region of the intruding object detecting apparatus, the transmitter is placed in the detection region, in the peripheral area thereof or moved therein so that the intruding object detecting apparatus receives a radio wave from the transmitter while the transmitter transmits a radio wave having a frequency capable of being received by the reception antenna of the intruding object detection apparatus, which makes it possible that the detection region set by the intruding object detecting apparatus is confirmed, thereby enabling easy confirmation on whether or not the detection region intended by a setter has been effectively set.

In a sixth aspect the invention provides an intruding object detecting apparatus radiating a radio wave into a detection region to receive a radio wave (a reflection wave) reflected from an object intruding into the detection region and to thereby detect the object, including: a transmission antenna radiating a radio wave; a reception antenna receiving a reflection wave of the radio wave; scanning means altering directions or directivities of the transmission antenna and the reception antenna; calculation means calculating a position of the object based on the reflection wave received by the reception antenna and a direction thereof obtained by the scanning means; storage means storing the detection region set in advance by a reflector or a transmitter, or a setting apparatus constituted of the reflector and the transmitter; and collation means collating the position of the object specified by the calculation means and the detection region stored in the storage means.

According to the sixth aspect of the invention, the detection region of the intruding object detecting apparatus is stored in advance in the storage means, which makes it possible that a single intruding object detecting apparatus monitors the detection region or regions, even if they are of a complicated shape each and set in discrete places.

Furthermore, in order to set the detection region of the intruding object detecting apparatus, there are used the reflector or the transmitter, or the setting apparatus constituted of the reflector and the transmitter, which makes it possible that a detection region is set based on an actual place or places to be the detection region; thereby enabling the detection region to be set with ease and certainty.

In a seventh aspect the invention provides a reflector setting or confirming setting of a detection region of an intruding object detecting apparatus radiating a radio wave into the detection region to receive a radio wave (a reflection wave) reflected from an object intruding into the detection region and to thereby detect the object, and reflecting a radio wave radiated from a transmission antenna of the intruding object detecting apparatus in an almost incident direction of the radio wave with an opposite sign.

According to the seventh aspect of the invention, the reflector, having a predetermined reflectance for a radio wave radiated from the transmission antenna, and reflecting the radio wave in the almost incident direction is placed in a place that is desired to be set as the detection region when setting with an intruding object detecting apparatus, reflects the radio wave radiated from the transmission antenna to a reception antenna, thereby enabling setting of or confirmation of setting of the detection region of the intruding object detecting apparatus with ease.

In an eighth aspect the invention provides a transmitter setting or confirming setting of a detection region of an intruding object detecting apparatus radiating a radio wave into the detection region to receive a radio wave (a reflection wave) reflected from an object intruding into the detection region and to thereby detect the object, and transmitting a radio wave having a frequency capable of being received by a reception antenna of the intruding object detecting apparatus.

According to the eighth aspect of the invention, the transmitter transmits the radio wave having a frequency capable of being received by the reception antenna of the intruding object detection apparatus when setting the detection region of the intruding object detecting apparatus, which makes it possible that the intruding object detecting apparatus specifies a direction of the transmitter with ease, there by enabling the detection region to be set with simplicity. Especially, when a radio wave is radiated from the intruding object detecting apparatus in a case where an installed object is placed in a place that is to be set as the detection region, the eighth invention is effective for setting or confirmation of setting such a place as the detection region, where complexity in reflection occurs.

In a second preferred embodiment the transmitter comprises input means, and transmits a setting value inputted from the input means thereto.

With such a construction adopted, a setter can input the setting value to the transmitter in a place that is set as the detection region and transmit the setting value therefrom, which makes it possible that the intruding object detecting apparatus not only specifies a direction of a radio wave from the transmitter and sets a place in the direction as the detection region, but also facilitates complicated setting of the detection region.

In a ninth aspect the invention provides a setting apparatus setting or confirming setting of a detection region of an intruding object detecting apparatus radiating a radio wave into the detection region to receive a radio wave (a reflection wave) reflected from an object intruding into the detection region and to thereby detect the object, includes: a reflector reflecting a radio wave radiated from a transmission antenna of the intruding object detecting apparatus in an almost incident direction with an opposite sign; and a transmitter transmitting a radio wave having a frequency capable of being received by a reception antenna of the intruding object detecting apparatus.

According to the ninth aspect of the invention, the transmitter transmits the radio wave having a frequency capable of being received by the reception antenna of the intruding object detection apparatus when setting the detection region of the intruding object detecting apparatus, which makes it possible that the intruding object detecting apparatus specifies a direction of the transmitter with ease; furthermore, a radio wave is radiated from the transmission antenna of the intruding object detecting apparatus in the direction and a reflection wave from the reflector of the setting apparatus is received by the receiving antenna of the intruding object detecting apparatus, which makes it possible that a distance to the setting apparatus can be calculated, thereby enabling the detection region to be set with correctness.

DETAILED DESCRIPTION OF THE INVENTION

Figure 1:
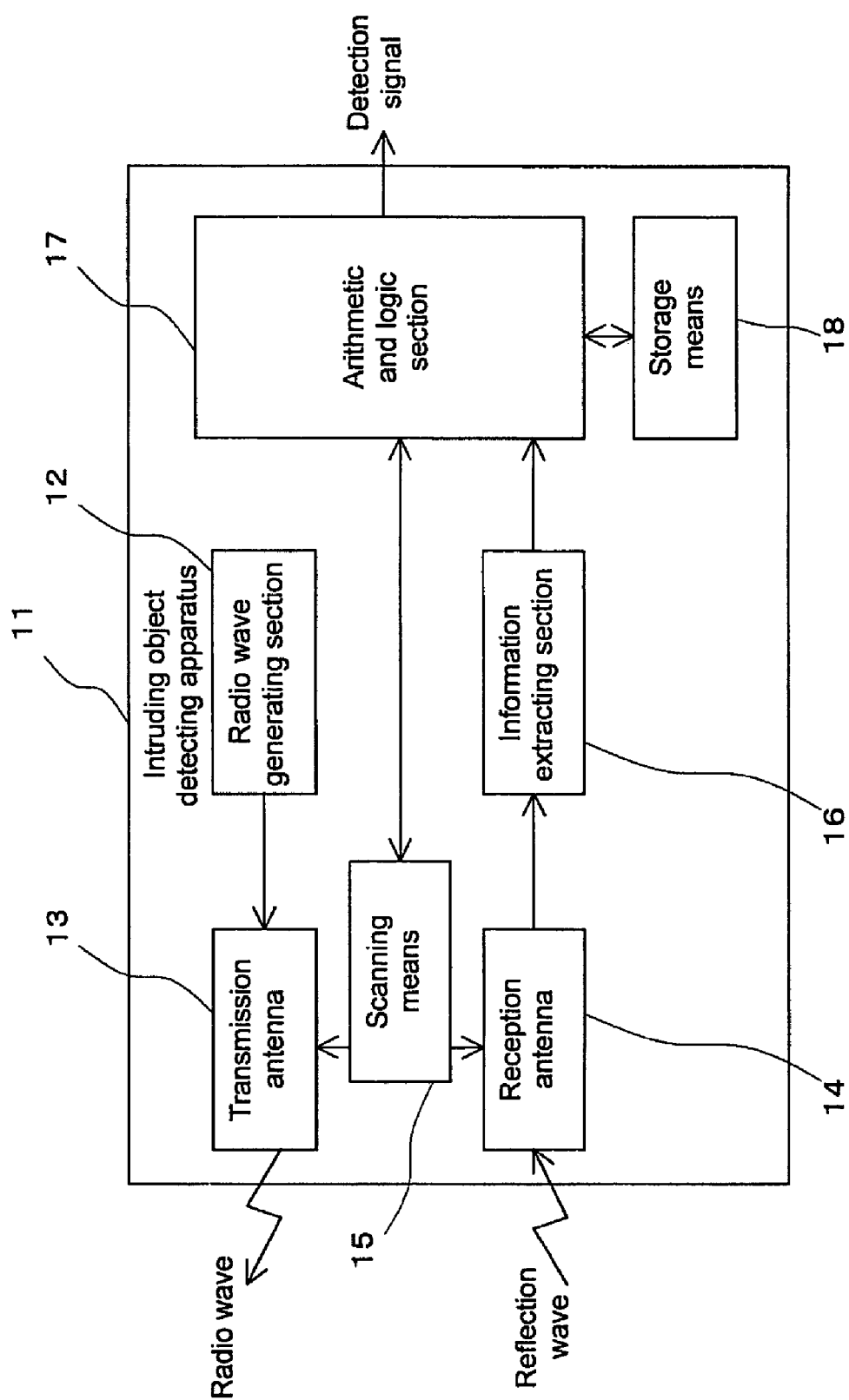
FIG. 1 is a hardware block diagram of an intruding object detecting apparatus.

Detailed description will be given of an intruding object detecting apparatus, an apparatus for setting a detection region of the intruding object detecting apparatus and a setting process therefor, related to the present invention showing concrete embodiments below with reference to the accompanying drawings. FIG. 1 is a hardware block diagram of an embodiment of an intruding object detecting apparatus 11. A high frequency wave (for example, 2.5 GHz) necessary for a radar is generated in a radio wave generating section 12 and the radio wave is radiated into the air from a transmission antenna 13. The radio wave radiated into the air is reflected by an object existing in a space and received by a reception antenna 14 as a reflection wave. The transmission antenna 13 and the reception antenna 14 are constructed so that directions thereof can be altered by a scanning means 15 constituted of a motor and an encoder. The motor and the encoder are connected to an arithmetic and logic section 17 so that the arithmetic and logic section 17 can control directions of the antennas.

A reflection wave received by the reception antenna 14 is inputted to an information extracting section 16. The information extracting section 16 is a processing section extracting a distance based on a spectrum of the reflection wave in a case where a Doppler radar is employed as a radar type, while being a processing section extracting a distance up to an object based on a time of a reflection wave in a case where a pulse radar is employed as a radar type. Note that no specific limitation is imposed on a particular type of a radar, but any type may be used as far as a distance up to an object can be extracted based on a reflection wave as information. In a case where setting is performed by a transmitter 31 described later, the information extracting section 16 has a function to decode information sent from the transmitter 31.

The information from the information extracting section 16 is inputted to the arithmetic and logic section 17, where calculated using the input information is positional information together with a value of a direction obtained from the encoder of the scanning means 15. A flag, indicating that a position thereof is a detection region, and the position of which is in one-to-one correspondence with calculated positional information on a memory space of storage means 18 (in FIGS. 5A and 5B, a value of a flag described later is 1), is written to a storage means 18. In an ordinary operation detecting an intruding object to output a detection signal, collation is performed on positional information of an object and a detection region stored in the storage means 18 by the arithmetic and logic section 17, and if a position of the object is included in the detection region, a detection signal is outputted.

Note that a transmission/reception antenna may be used that is sharable between a transmission antenna and a reception antenna, in which case a transmitted radio wave and a received reflection wave have only to be separated from each other in a circuit including a directivity coupler and a circulator. While in the embodiment described above, the scanning means is shown as a type of mechanical scanning, it may be replaced with a scheme of electronic scanning using a phased array antenna. The arithmetic and logic section 17 includes a central processing unit (CPU) as a main constituent and others. The storage means 18 suitably includes a memory such as EEPROMs capable of freely writing or reading, and retaining information therein after power is turned off.

Figure 2:
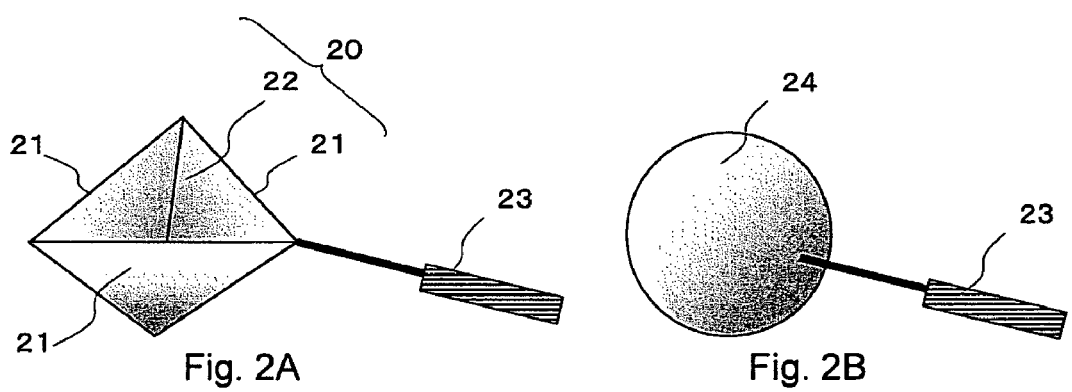
FIGS. 2A and 2B are views showing shapes of reflectors.

FIGS. 2A and 2B are perspective views of reflectors each for setting a detection region of an intruding object detecting section. FIG. 2A is a view of a corner reflector 20, which is constructed with three metal plates or three plates 21 on each of which a metal film is formed, and having the shape of a triangular prism one face of which is open in the air. The opening face 22 of the triangular prism is directed in an in-coming direction along which a radar wave propagates to the opening face 22, thereby enabling the radio wave can be reflected in the in-coming direction with an opposite sign. A size of a corner reflector (an opening section), in order to function well, is only required to be sufficiently larger than a wavelength of a radio wave and a size of the opening section of at least 10 cm across is sufficiently large in a frequency band from several to tens of GHz that is ordinarily employed in an intruding object detecting apparatus. The corner reflector has a shank 23 so that a person can handle it by hand. The shank 23 is designed so as to be extendable in order to prevent wrong setting due to reflection from a person operating the reflector when setting with the intruding object detecting apparatus and the operator can operate the reflector in a place behind an object or out of the reach of a radio wave.

FIG. 2B is a view of a convex surface reflector 24 covered with a smooth convex surface in the entirety and the reflector may be a hollow object made of metal, plastic on which a metal film or the like is formed. Since a convex surface reflects a diffused radio wave, the convex surface reflector 24 can be used with ease being unaware of a direction thereof, which is dissimilar to the corner reflector 20. A convex surface reflector is used in a case where transmission and reception antennae are not gathered at one site when installed.

While in FIGS. 2A and 2B, there are shown the examples each with a shank, it is recommended to install a reflector rested on a pan head in a place to be set.

A corner reflector and a convex surface reflector both have a characteristic capable of reflecting a radio wave in a direction opposite to an in-coming direction thereof and this characteristic is expressed as to reflect in an almost incidence direction with an opposite sign.

Since a corner reflector even small in size exhibits a reflectance higher than a person, a detection region can be set and confirmed with correctness even in the presence of an external disturbance in reflection from a person or the like by matching a threshold value in the setting and confirmation to a reflector.

While a reflector with a convex curved surface diffuses a reflection wave, a tolerance in direction of the reflector can be relaxed correspondingly to a degree of diffusion thereof when the reflector is installed. In other words, in a case where a convex curved surface is spherical, the reflector exerts its essential function if facing any direction.

Figure 3:
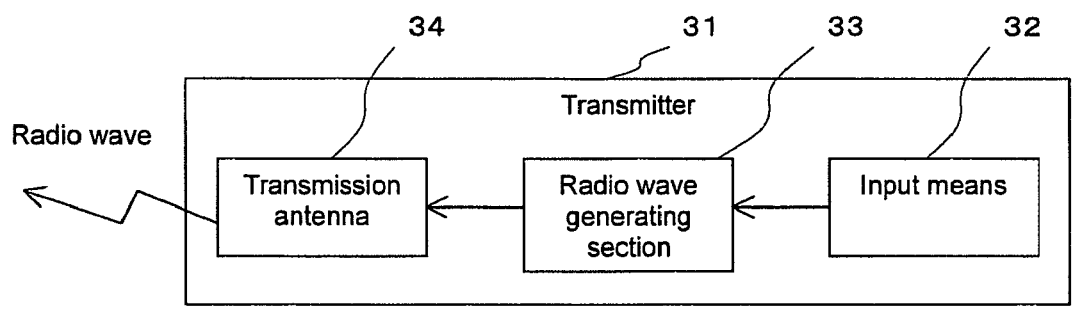
FIG. 3 is a hardware block diagram of a transmitter.

FIG. 3 is a hardware block diagram of a transmitter for setting a detection region of an intruding object detecting apparatus. The simplest embodiment among the kinds of transmitters is a push switch with input means of an ON/OFF type shown in FIG. 3, which workings are such that a radio wave is radiated from a transmission antenna while the push switch is pressed down to be turned on. Any frequency and any modulation of a radio wave are allowed to be employed as far as an intruding object detecting apparatus can receive the radio wave. With this transmitter adopted, an intruding object detecting apparatus can specify a direction of the transmitter; thereby enabling the direction to be set as a detection region.

As embodiments of a transmitter capable of setting at a high level, input means are a key board, a touch panel and the like, and with the input means adopted, there can be inputted setting information such as a distance, a size of a detection region, a threshold value and others. The information is carried on a radio wave to impart it to an intruding object detecting apparatus, thereby the intruding object detecting apparatus to set. Note that though not shown in the figure, it is allowed to use a liquid crystal display or the like presenting input information thereon.

Moreover, it is desirable that, in order to facilitate a position of a transmitter to be uniquely specified on the side of an intruding object detecting apparatus, the transmission antenna 34 of the transmitter is desirably an antenna with a strong directivity.

Figure 4:
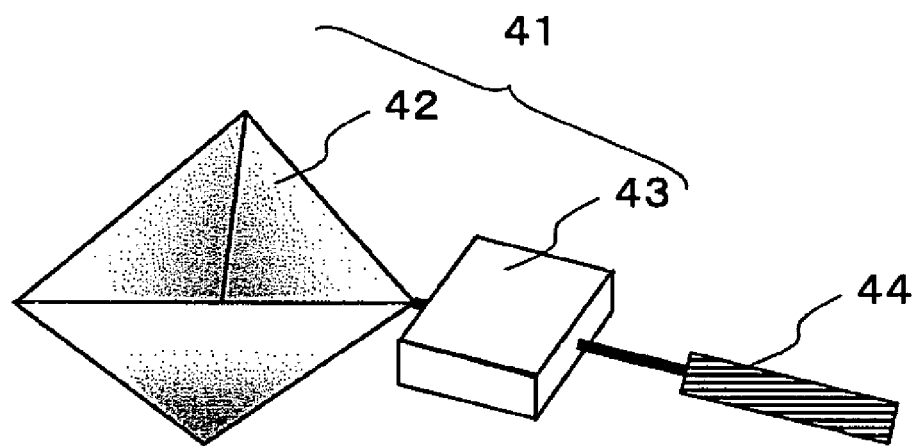
FIG. 4 is a view showing a shape of a setting apparatus.

FIG. 4 is a view showing a shape of a setting apparatus 41 constructed with a reflector 42 and a transmitter 43, combined. The transmitter 43 is installed at a position, closest to the reflector, on a shank 44 extending from the reflector. A detection region can be set more correctly than by either the reflector or the transmitter individually.

Figures 5A, 5B:
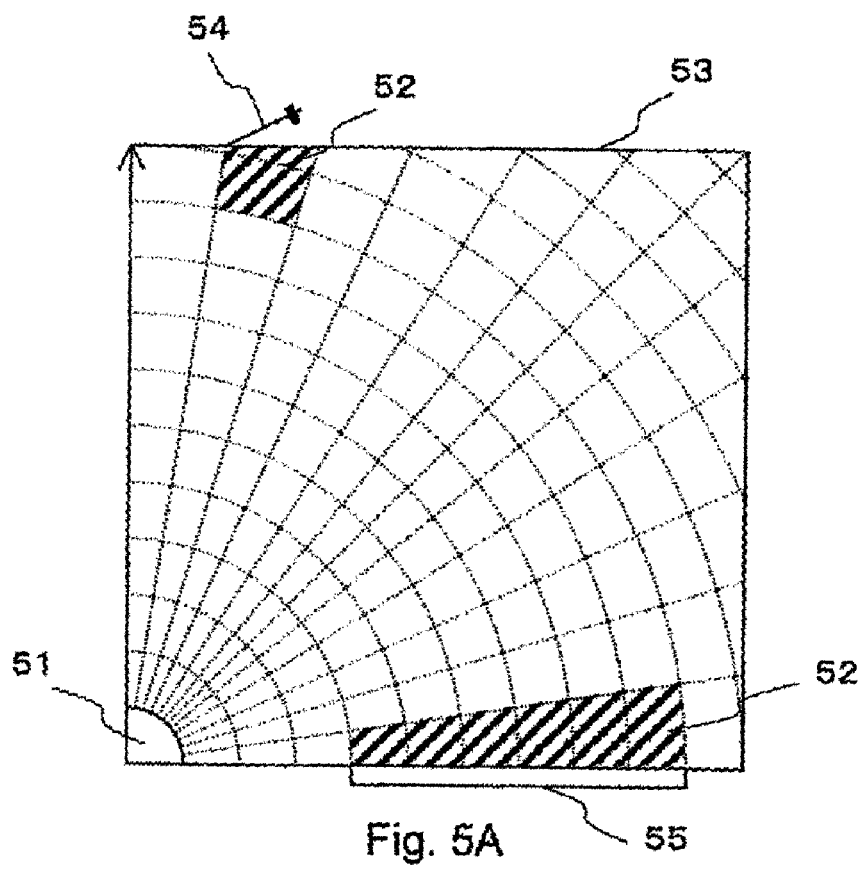
FIG. 5A is a model view of a state where a detection region is set and FIG. 5B is a table showing a state of a storage means corresponding to FIG. 5A.

FIG. 5A is a model view of a state where a detection region 52 of an intruding object detecting apparatus 51 is set and FIG. 5B is a table showing a state of a storage means corresponding to FIG. 5A. FIG. 5A is a model view of a room 53, as viewed from above, in which the intruding object detecting apparatus 51 is installed. Installed in the corner of the room 53 is the intruding object detecting apparatus 51 and a coordinate system is shown with dotted lines in which a location of the intruding object detecting apparatus 51 is an origin thereof, and a distance direction r and a scanning angle θ are coordinates. FIG. 5B shows a state of the storage means corresponding to the coordinate system shown in FIG. 5A. In a case where a door 54 is provided in the corner of the room 53 as shown in the figure and a window 55 is provided on the other side of the room from the door 54, an intruder (or an intruding object) into the room breaks through the door or the window. If, herein, the detection region 52 of the intruding object detecting apparatus is set so as to include areas around the door and the window as shown as obliquely hatched portions in FIG. 5A, an intruder can be monitored. In a case where the intruding object detecting apparatus is installed in this way, 1's are inputted at necessary sites of the storage means as the detection regions as shown in FIG. 5B and a detection region can be discriminated from the other area of the room in either a discrete or continuous manner. Moreover, since the detection regions 52 and information in the storage means are in a one to one correspondence relation, a complicated detection region can be set with ease by performing operations of inversion, AND and OR.

Figure 6:
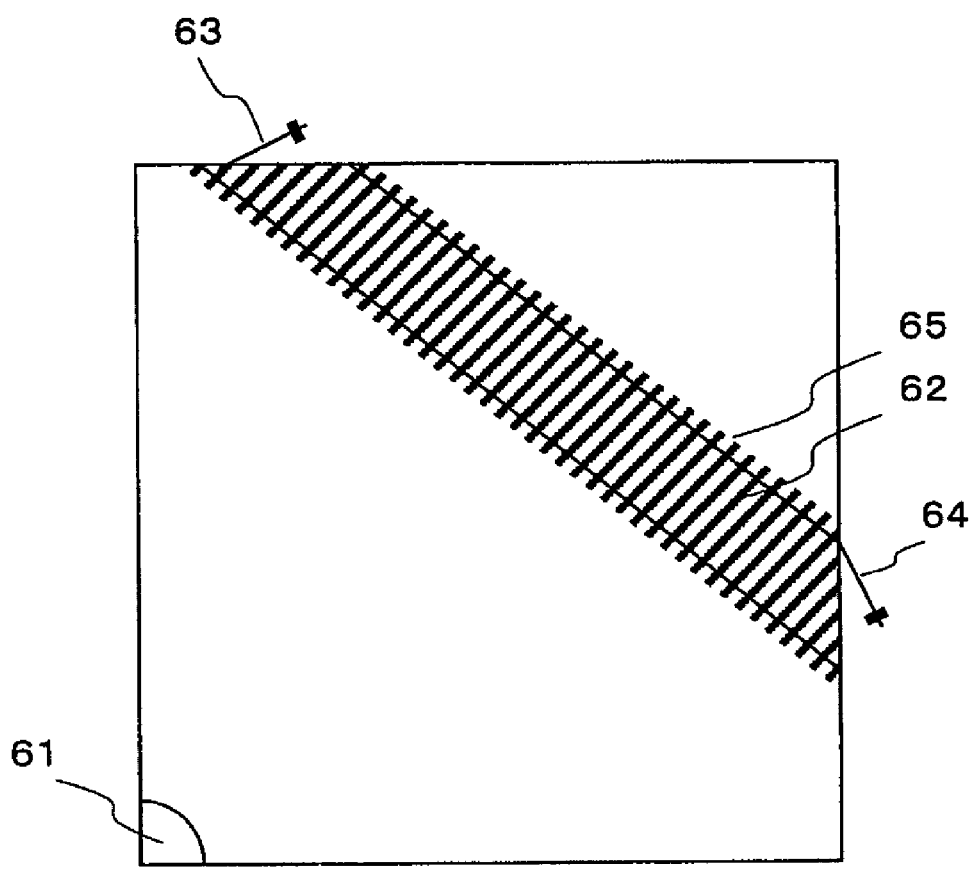
FIG. 6 is a model view of a state where a detection region is set.

FIG. 6 is a model view of a state where a continuous detection region 62 is set for an intruding object detecting apparatus 61. In this case, the detection region 62 is set continuously along a passage 65 between a door A63 and a door B64 and a function to track an intruder is added to the intruding object detecting apparatus 61, thereby also enabling only a person passing through the door A63 and the door B63 to be detected.

Figure 7A:
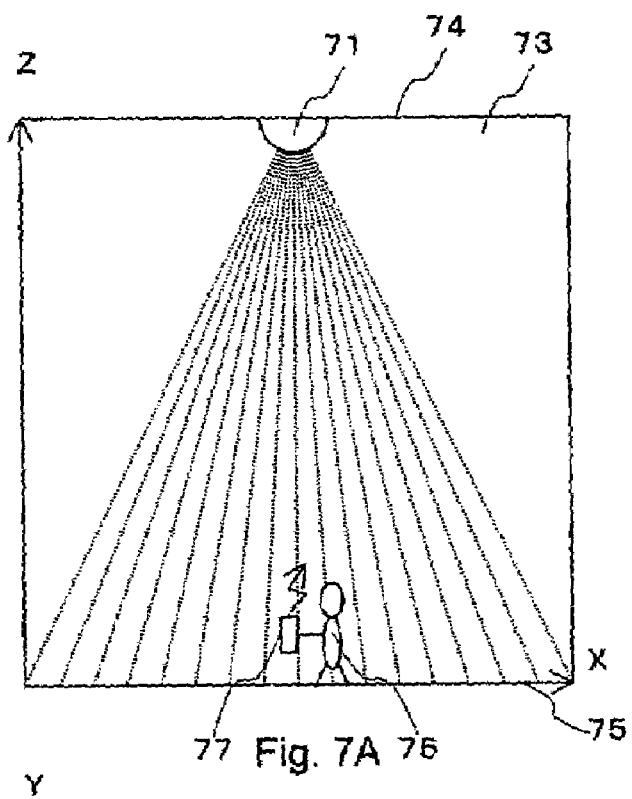
FIG. 7A is a model view of a state where a detection region is set and FIG. 7B is a representation of a state of a storage means.
Figure 7B:
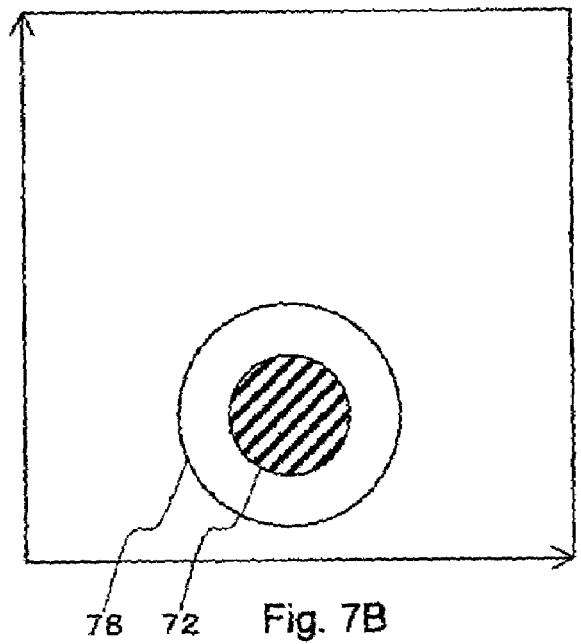

FIG. 7A is a model view of a state where a detection region 72 of an intruding object detecting apparatus 71 is set and FIG. 7B is a representation of a state of a storage means. FIG. 7A is a mode view of the room 73 in which the intruding object detecting apparatus 71 is installed, as viewed from a side of the room. The intruding object detecting apparatus 71 is installed on a ceiling 74 of the room 73 and a scanning means has a mechanism capable of scanning the XY plane, which is a flow surface 75, two-dimensionally. Dotted lines shown in FIG. 7A exhibit directions along which scanning is performed as a mode. A setter 76 can set the detection region 72 with the transmitter 77 and in FIG. 7A. there is set a detection region in the vicinity of the center of the room.

FIG. 7B is a state of a storage region of a storage means having the same coordinate system as on the XY plane of the floor shown in FIG. 7A and an obliquely hatched portion is set as the detection region 72 with a in-coming direction of a radio wave as a center of the detection region. While the obliquely hatched portion is depicted as a circle, which is a model, an area of any shape can be set as the detection region by narrowing a directivity of an antenna and reducing a step spacing of scanning. A size of the detection region 72 can be altered by transmitting detailed setting information from the transmitter and the detection region can be set as a larger circle 78 shown in FIG. 7B. In addition, a setting value is inputted by the input means of the transmitter, thereby enabling complicated setting such as setting of a shape of the detection region to be of a quadrangle, setting of threshold values for detecting plural detection regions in the respective plural detection regions, and the like.

Figure 8:
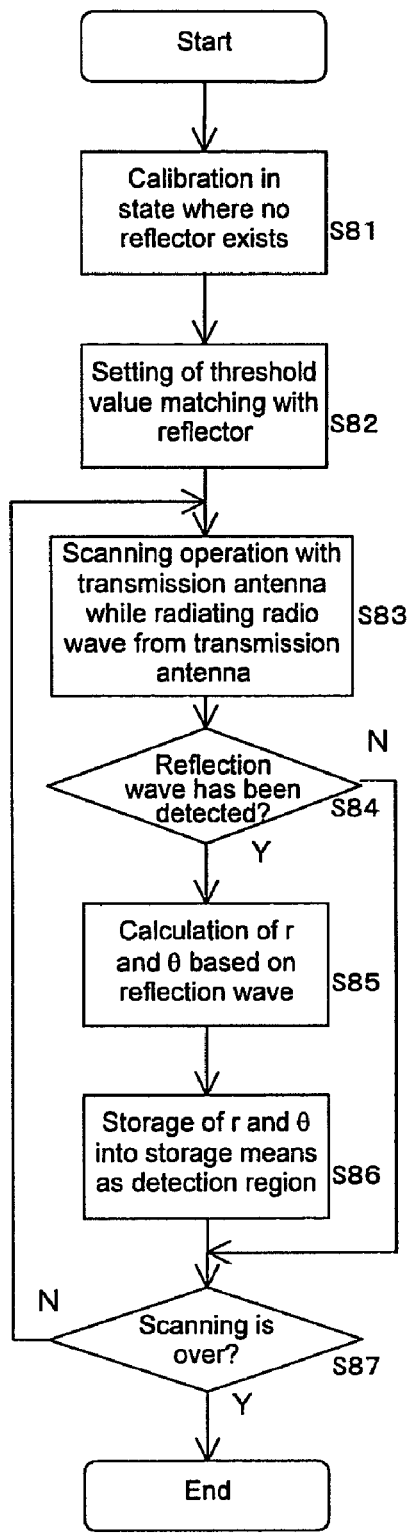
FIG. 8 is a flowchart showing a process setting a detection region with a reflector.

FIG. 8 is a flowchart showing a process setting a detection region of an intruding object detecting apparatus with a reflector. At first, calibration is performed in S81 that confirms a situation where the intruding object detecting apparatus is installed in a state where no reflector exists. The calibration is performed in an initial situation where the intruding object detecting apparatus is installed in order not to set reflections from walls, corner posts and studs of a room as the detection region in error since there exist various situations in a place where the intruding detecting apparatus is installed.

Then, since the detection region is set using the reflector in this case, a threshold value matching with the reflector in S82. Since a reflectance of the reflector used here is higher than a human body, there is no chance that a person holding the reflector and performing setting is set by mistake. Furthermore, it is enabled to perform setting in a place where a current of persons cannot be stopped.

Performed in S83 is a scanning operation with a transmission antenna of the intruding object detecting apparatus installed in a place where there is allowed an extensive view wide enough to enable a detectable region to be looked around while radiating a pulse-shaped radio wave from the transmission antenna of the intruding object detecting apparatus.

It is determined in S84 whether or not a reflection wave has been detected from the reflector. If the reflection wave has not been detected (N), scanning with the antenna is continued, while if the reflection radio has been detected (Y), a distance r from the intruding object detecting apparatus to the reflector is calculated based on a transmission time point of a pulse and a reception time point of the reflection wave, or alternatively, a scanning angle θ of the antenna, when the reflection wave is obtained, is calculated with an encoder incorporated in an operation means (S85). The obtained r and θ are stored as a new detection region into the storage means (S86).

One pass of scanning with an antenna is defined as scanning once over a scanning angle range from end to end with an end of the scanning angle range as a reference. It is determined in S87 whether or not one pass of scanning is over and if not ended, scanning is continued without interruption. In a case where setting cannot be performed in one pass of scanning since the setting is to be performed in plural detection regions, setting is performed sequentially in the plural other detection regions while moving the reflector and it is only required to continue scanning till all of the setting is completed. Alternatively, reflectors are provided correspondingly to the respective plural detection regions to be set; thereby also enabling the setting to be achieved with one pass of scanning.

Figure 9:
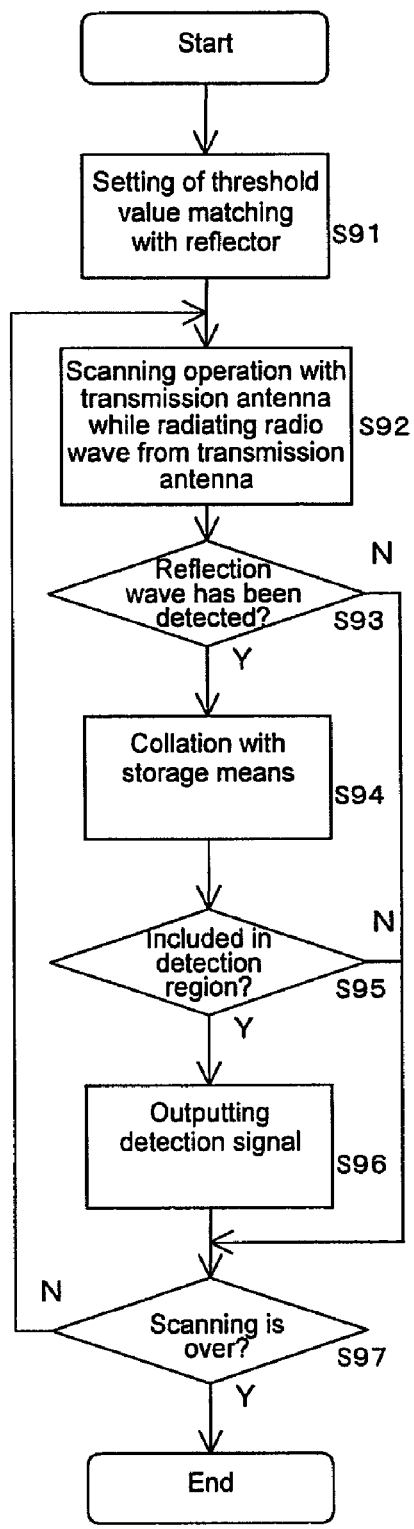
FIG. 9 is a flowchart showing a first process confirming a detection region with a reflector.

FIG. 9 is a flowchart showing a first process confirming a detection region of an intruding object detecting apparatus with a reflector. At first, a threshold value matching with the reflector is set (S91). This setting is similar to the contents described above. Then, scanning with a transmission antenna is performed while radiating a radio wave (S92).

It is determined in S93 whether or not a reflection wave has been detected and if not detected (N), scanning is continued, while if detected (Y), collation with the storage means is performed (S94).

Performed in S95 is collation of a position of the reflector and the detection region stored in the storage means and if the position of the reflector is not included in the detection region (N), scanning is continued, while if included (Y), the intruding object detecting apparatus performs processing for outputting a detection signal (S96); therefore, it can be confirmed that the position of the reflector is set as the detection region.

It is determined in S97 whether or not scanning is over and if the scanning is not over (N), the scanning is continued, while if the scanning is over (Y), a series of steps in the confirmation operation are completed. In a case where setting cannot be performed in one pass of scanning since the setting is performed in plural detection regions, confirmation is performed sequentially in the plural detection regions while moving the reflector and it is only required to continue scanning till all of the setting is completed.

Figure 10:
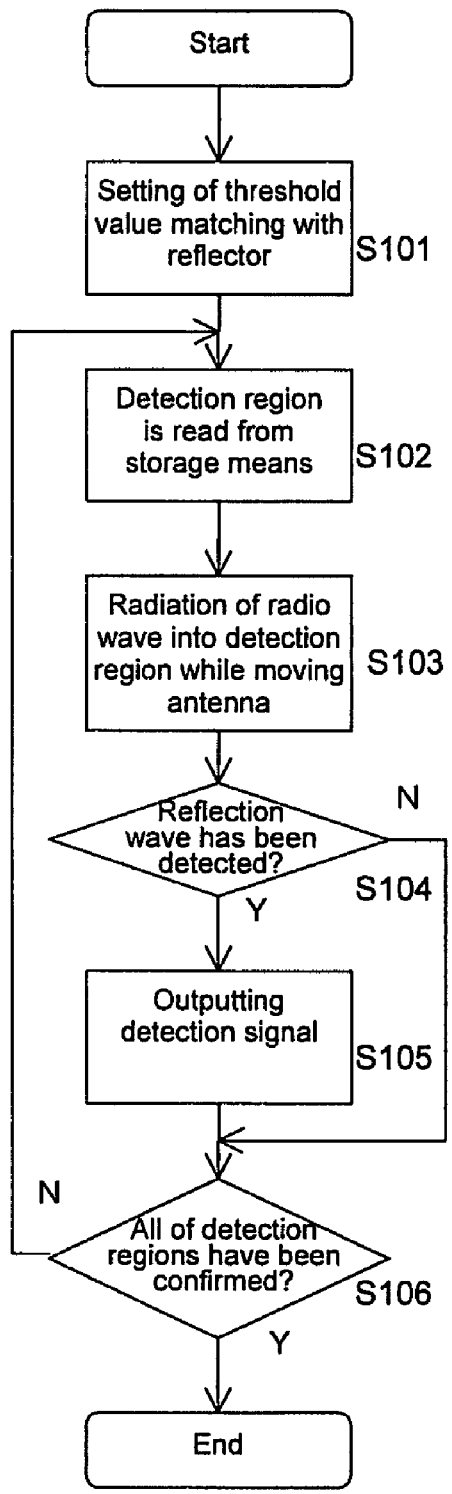
FIG. 10 is a flowchart showing a second process confirming a detection region with a reflector.

FIG. 10 is a flowchart showing a second process confirming a detection region of an intruding object detecting apparatus with a reflector. At first, a threshold value matching with a reflector is set (S101). This setting is similar to the contents described above. Then, the detection region is read from the storage means (S102), the antenna is moved to the value of an angle θ corresponding to the detection region to radiate a radio wave (S103) and it is determined whether or not a reflection wave from a distance r can be detected (S104). If the reflection wave has been detected (Y), the intruding object detecting apparatus perform processing for outputting a detection signal (S105); therefore, it can be confirmed that the position of the reflector is set as the detection region. If the reflection wave has not been detected (N), the process goes to the next processing.

It is confirmed in S106 whether or not all of the detection regions have been confirmed on the setting as such and if some of the detection regions are left unconfirmed (N), the process returns to S10 to continue the confirmation operation in the detection regions. If all of the confirmation operation is completed (Y), a series of steps in the processing is terminated.

Figure 11:
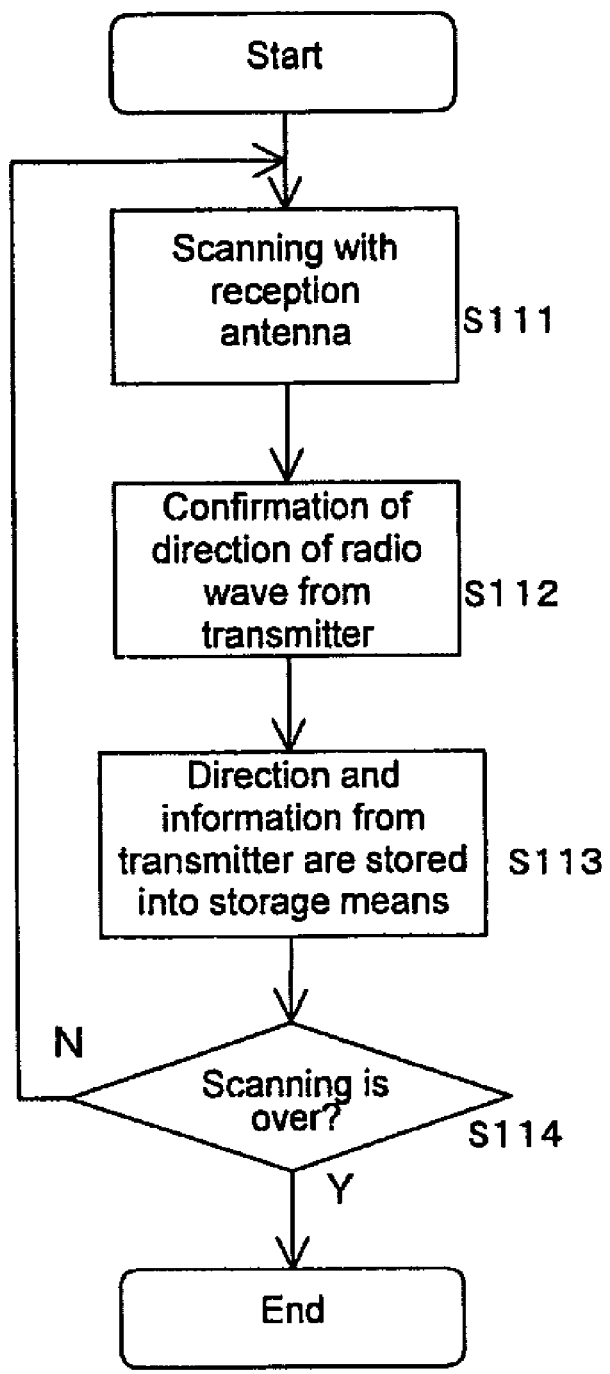
FIG. 11 is a flowchart showing a process setting a detection region with a transmitter.

FIG. 11 is a flowchart showing a process setting a detection region of an intruding object detecting apparatus with a transmitter. At first, the transmission antenna is moved for scanning (S111) to confirm a direction of a radio wave from the transmitter (S112). The direction confirmed in the scanning and information from the transmitter are processed to store the detection region into the storage means (S113).

It is determined in S114 whether or not the scanning is over and if the canning is not over (N), the scanning is continued, while the scanning is over (Y), a series of steps in the confirmation operation is terminated. If there exist plural setting sites, the setting may be continued for the next setting site without terminating the scanning. Determination on termination of the scanning may be given from the transmitter.

Figure 12:
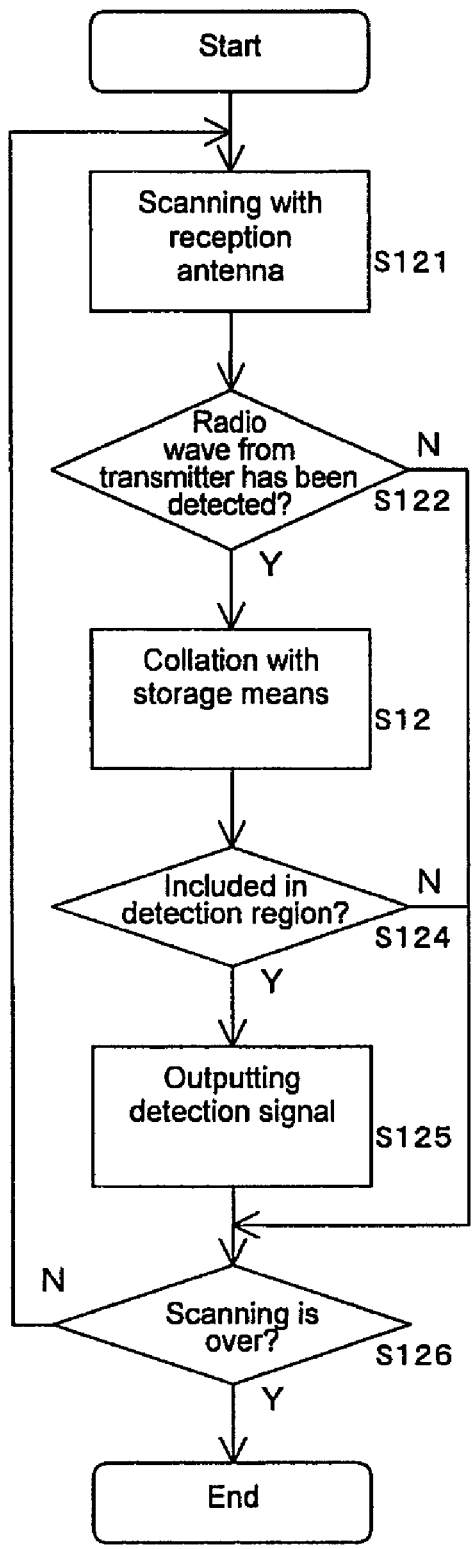
FIG. 12 is a flowchart showing a first process confirming a detection region with a transmitter.

FIG. 12 is a flowchart showing a first process confirming a detection region of an intruding object detecting apparatus with a transmitter. At first, scanning with the reception antenna is performed (S121) and it is determined whether or not a radio wave from the transmitter has been detected (S122). If a radio wave from the transmitter has not been detected (N), the scanning is continued. If a radio wave from the transmitter has been detected (Y), collation is performed with the detection region stored in the storage means (S123). Then, it is determined whether or not a position of the transmitter is included in the detection region (S124). If the position is not included (N), the scanning is continued. If the position is included (Y), the intruding object detecting apparatus performs a processing for outputting a detection signal (S125); therefore, it can be confirmed that the position of the transmitter is set as the detection region.

It is determined in S126 whether or not the scanning is over and if the scanning is not over (N), the scanning is continued, while the scanning is over (Y), a series of steps in the confirmation operation is terminated. In a case where setting cannot be performed in one pass of scanning since the setting is performed at plural detection region, confirmation is performed sequentially in the plural other detection regions while moving the transmitter and it is only required to continue scanning till all of the setting is completed.

Figure 13:
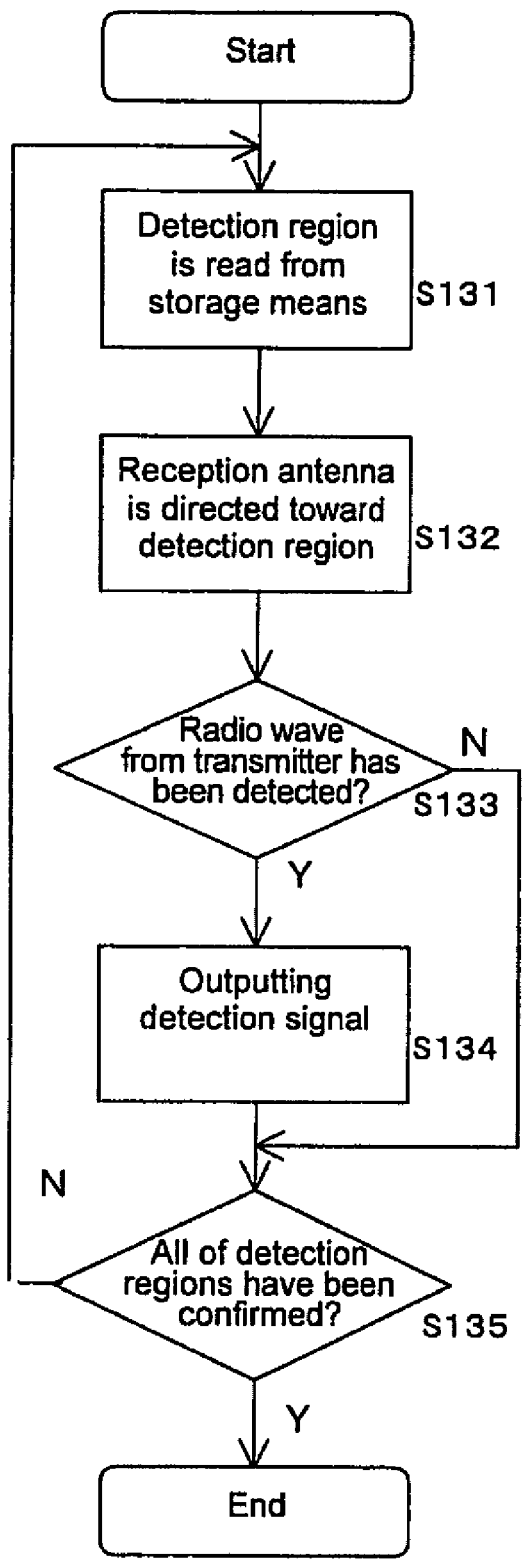
FIG. 13 is a flowchart showing a second process confirming a detection region with a transmitter.

FIG. 13 is a flowchart showing a second process confirming a detection region of an intruding object detecting apparatus with a reflector. At first, the detection region is read from the storage means (S131), the reception antenna is directed in the direction towardthe detection region (S132) and it is determined whether or not a radio wave from the transmitter can be detected (S133). If the radio wave has been detected (Y), the intruding object detecting apparatus performs a processing for outputting a detection signal (S134); therefore, it can be confirmed that the position of the transmitter is set as the detection region. If the radio wave has not been detected (N), the process goes to the next processing.

It is confirmed in S135 whether or not all of the detection regions has been confirmed on the setting as such and if some of the detection regions are left unconfirmed (N), the process returns to S13 to continue a confirmation operation in the other detection regions. If all of the confirmation operation is completed (Y), a series of steps in the processing is terminated.

Figure 14:
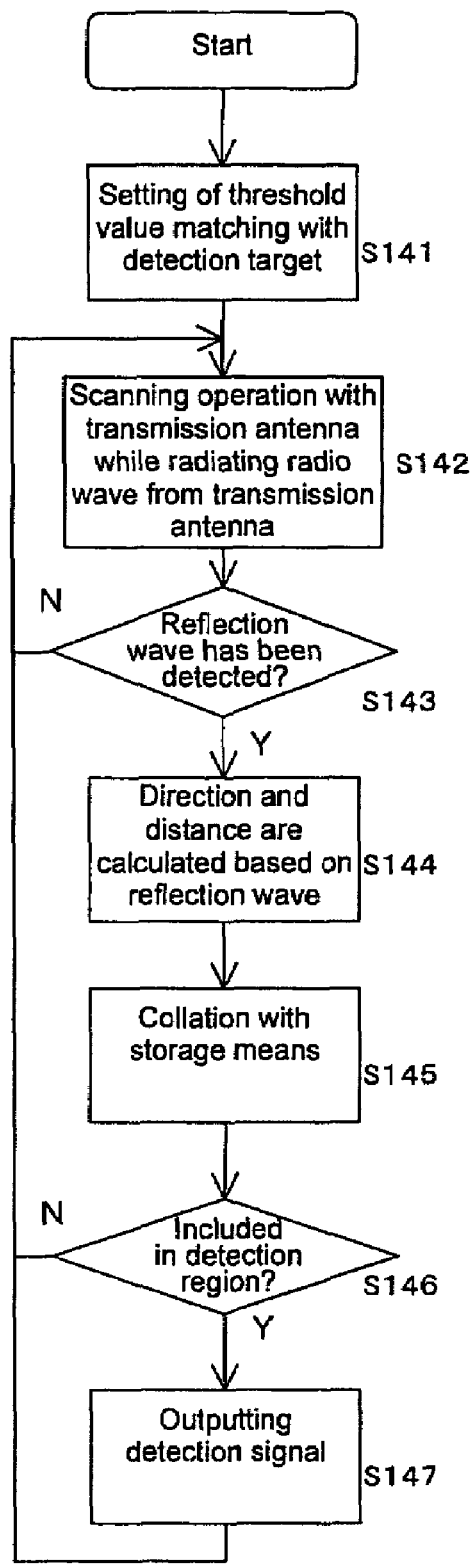
FIG. 14 is a flowchart showing a first process for an ordinary operation detecting an intruding object.

FIG. 14 is a flowchart showing a first process for an ordinary operation detecting an intruding object with an intruding object detecting apparatus. At first, there is performed setting of a threshold value, matching with a detection target, for detecting a reflection wave (S141). While in a case where the detection region is set with the reflector, a threshold value for detecting a reflection wave is raised in order to exclude reflection from a person, a threshold value in this case is set low so as to be enable a person to be detected. Moreover, if a threshold value at the upper limit is also set, a possibility of wrong detection can be reduced. In a case where an object high in reflectance such as an automobile, a threshold value is set higher than in the case of a person.

Then, scanning with the transmission antenna is performed while radiating a radio wave from the transmission antenna (S142). It is determined in S143 whether or not a reflection wave from an intruding object has been detected and if not detected (N), the scanning is continued, while if detected (Y), a direction 0 and a distance r are calculated based on the reflection wave (S144), collation with the storage means is performed (S145).

It is determined in S146 whether or not a position of the intruding object is included in the detection region stored in the storage means and if not included (N), the scanning is continued, while if included (Y), the intruding object detecting apparatus performs a processing for outputting a detection signal (S147).

Figure 15:
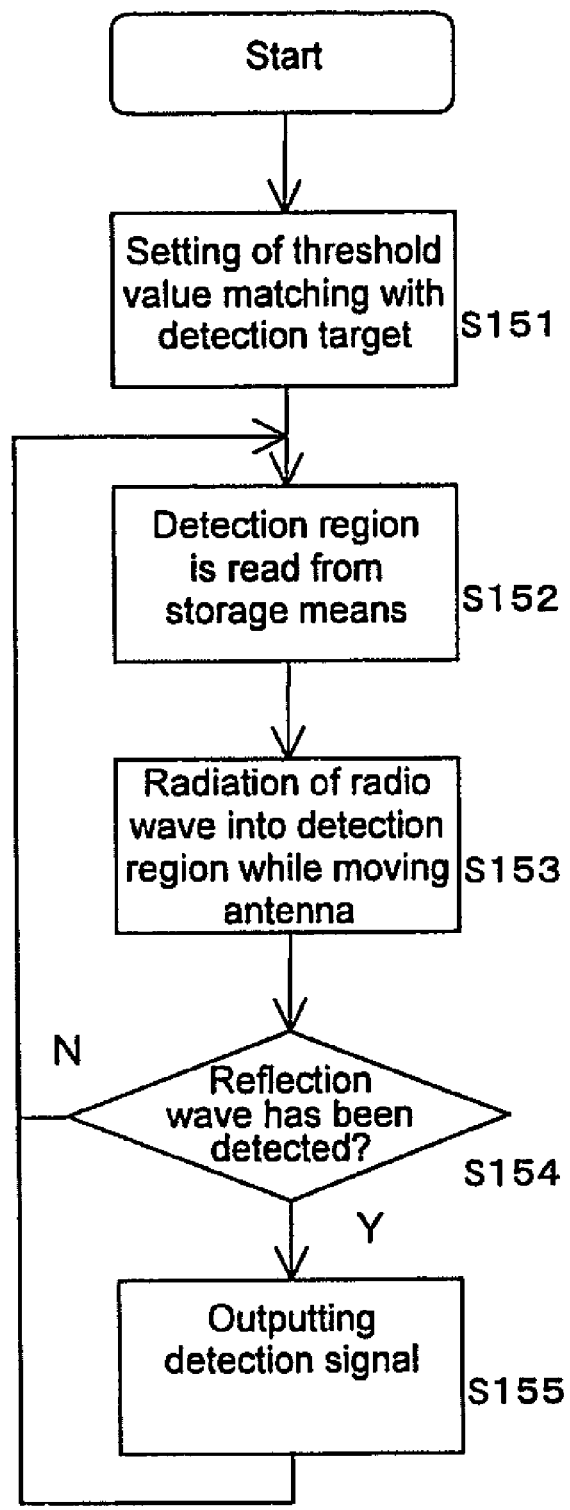
FIG. 15 is a flowchart showing a second process for an ordinary operation detecting an intruding object.

FIG. 15 is a flowchart showing a second process for an ordinary operation detecting an intruding object with an intruding object detecting apparatus. At first, there is performed setting a threshold value matching to a detection target (S151). This setting is similar to the contents described above. Then, the detection region is read from the storage means (S152), the antenna is moved to a value of an angle $\theta$ corresponding to the detection region and radiates a radio wave (S153) and it is determined whether or not a reflection wave from a distance r can be detected (S154). If the reflection wave from an intruding object has been detected (Y), the intruding object detecting apparatus performs a processing (S155) for outputting a detection signal.

According to the present invention, as described above, a detection region of an intruding object detecting apparatus can be set in a place or places where an intruding object is to be actually detected with ease by a reflector or a transmitter, or a setting apparatus constituted of the reflector and the transmitter as a single pieces operable directly by hand of a setter. Moreover, it can be confirmed by the reflector or the transmitter with simplicity whether or not setting of a detection region has been correctly performed.

The invention claimed is:

1. A method for detecting an object in a detection region, comprising:
   placing a reflector in the detection region;
   radiating the detection region with a radio wave transmitted from a transmission antenna;
   receiving a reflected wave reflected by the reflector using a reception antenna;
   calculating a position of the reflector based on the reflected wave; and
   storing the calculated position as the detection region.

2. A method for detecting an object in a detection region, comprising:
   placing a transmitter in the detection region;
   receiving a radio wave from the transmitter using a reception antenna;
   calculating a position of the transmitter based on the radio wave from the transmitter; and
   storing the calculated position as the detection region.

3. The method of claim 2, further comprising:
inputting a setting value;
transmitting the inputted setting value using the transmitter;
determining the detection region based on the setting value; and
storing the detection region.

4. A method for detecting an object in a detection region, comprising:
placing a setting apparatus comprising a reflector and a transmitter in the detection region;
receiving a radio wave from the setting apparatus using a reception antenna;
radiating the detection region with a radio wave transmitted from a transmission antenna,
receiving a reflected wave reflected by the setting apparatus using the reception antenna;
calculating a position of the setting apparatus based on the radio wave from the setting apparatus and the reflected wave; and
storing the calculated position as the detection region.

5. A method for confirming a position of an object in a detection region, comprising:
placing a reflector in the detection region;
radiating the detection region with a radio wave transmitted from a transmission antenna;
receiving a reflected wave reflected by the reflector using a reception antenna;
calculating a position of the reflector based on the reflection wave;
comparing the calculated position with a stored detection region; and
outputting a detection signal when the calculated position is in the detection region.

6. A method for confirming a position of an object in a detection region, comprising:
placing a transmitter in the detection region;
transmitting a radio wave from the transmitter; and
comparing a position of the transmitter that is calculated based on the radio wave with a stored detection region; and
outputting a detection signal when the position of the transmitter is in the detection region.

7. An intruding object detecting apparatus for detecting an object within a detection region, comprising:
a transmission antenna configured to radiate a radio wave;
a reception antenna configured to receive a reflected wave;
scanning means configured to alter directions of the transmission antenna and the reception antenna;
calculation means configured to calculate a position of the object based on the reflection wave received by the reception antenna and a direction thereof obtained by the scanning means;
storage means configured to store a predetermined setting value that corresponds to the detection region; and
comparing means configured to compare the position of the object specified by the calculation means and the detection region specified by the setting value stored in the storage means.

8. The intruding object detecting apparatus of claim 7, wherein the setting value is set in advance based on a reflector that reflects the radio wave radiated from a transmission antenna of the intruding object detecting apparatus in an almost incident direction of the radio wave with an opposite sign.

9. The intruding object detecting apparatus of claim 7, wherein the setting value is set in advance based on a transmitter that transmits the radio wave having a frequency capable of being received by a reception antenna of the intruding object detecting apparatus.

10. The intruding object detecting apparatus of claim 9, further comprising:
input means configured to input the setting value; and
transmitting means configured to transmit the setting value.

11. The intruding object detecting apparatus of claim 7, wherein the setting value is set in advance based on a setting apparatus comprising:
a reflector configured to reflect the radio wave from the transmission antenna in an almost incident direction with an opposite sign; and
a transmitter configured to transmit the reflected radio wave with frequency that is receivable by the reception antenna.

* * * * *